(12) United States Patent
Lott et al.

(10) Patent No.: US 8,923,125 B2
(45) Date of Patent: Dec. 30, 2014

(54) WIRELESS NETWORK RESOURCE ADAPTATION

(75) Inventors: Christopher Gerard Lott, San Diego, CA (US); Donna Ghosh, San Diego, CA (US); Rashid Ahmed Akbar Attar, San Diego, CA (US); Peter John Black, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 547 days.

(21) Appl. No.: 12/582,949

(22) Filed: Oct. 21, 2009

(65) Prior Publication Data

US 2010/0165845 A1 Jul. 1, 2010

Related U.S. Application Data

(60) Provisional application No. 61/108,330, filed on Oct. 24, 2008, provisional application No. 61/121,090, filed on Dec. 9, 2008.

(51) Int. Cl.
| | | |
|---|---|---|
| *G01R 31/08* | (2006.01) | |
| *H04W 28/08* | (2009.01) | |
| *H04L 12/801* | (2013.01) | |
| *H04W 72/04* | (2009.01) | |
| *H04W 72/00* | (2009.01) | |
| *H04W 48/16* | (2009.01) | |

(52) U.S. Cl.
CPC .......... *H04W 28/08* (2013.01); *H04W 72/0486* (2013.01); *H04W 72/00* (2013.01); *H04W 48/16* (2013.01); *H04L 47/10* (2013.01)
USPC .......................................... 370/235; 370/328

(58) Field of Classification Search
None
See application file for complete search history.

(56) References Cited

U.S. PATENT DOCUMENTS

| | | | |
|---|---|---|---|
| 6,563,810 B1 | 5/2003 | Corazza | |
| 6,947,748 B2 * | 9/2005 | Li et al. | 455/450 |
| 7,099,384 B1 | 8/2006 | Jalali et al. | |
| 7,277,709 B2 * | 10/2007 | Vadgama | 455/453 |
| 7,680,093 B2 * | 3/2010 | Duan et al. | 370/342 |

(Continued)

FOREIGN PATENT DOCUMENTS

| | | |
|---|---|---|
| CN | 1860740 A | 11/2006 |
| CN | 101010978 A | 8/2007 |

(Continued)

OTHER PUBLICATIONS

International Search Report—PCT/US2009/061703—International Search Authority—European Patent Office, May 10, 2010.

(Continued)

*Primary Examiner* — David Oveissi
(74) *Attorney, Agent, or Firm* — Jeffrey D. Jacobs

(57) ABSTRACT

A method of regulating data flow in a wireless communication network includes: collecting data regarding dynamic loading of sector-carrier pairs (pilots) in communication sectors of the wireless communication network; obtaining data rates for data flows of the pilots to access terminals within the wireless communication network; determining one or more pilots to use for conveying data in the wireless communication network based on the data rates and the dynamic loading; and altering data flow over the pilots by at least one of changing a data rate over at least one of the pilots or changing a combination of pilots used by the wireless communication network for conveying data to increase total data flow.

35 Claims, 10 Drawing Sheets

(56) References Cited

U.S. PATENT DOCUMENTS

| | | | |
|---|---|---|---|
| 2001/0034235 A1* | 10/2001 | Froula | 455/446 |
| 2005/0152320 A1 | 7/2005 | Marinier et al. | |
| 2005/0164709 A1 | 7/2005 | Balasubramanian et al. | |
| 2008/0062925 A1* | 3/2008 | Mate et al. | 370/331 |

FOREIGN PATENT DOCUMENTS

| | | |
|---|---|---|
| EP | 1058408 A1 | 12/2000 |
| EP | 1284583 A2 | 2/2003 |
| JP | 2005502218 A | 1/2005 |
| JP | 2007523509 A | 8/2007 |
| JP | 2008042736 A | 2/2008 |
| KR | 100695048 B1 | 3/2007 |
| KR | 20080102399 A | 11/2008 |
| WO | 0124568 A1 | 4/2001 |
| WO | 0219563 A2 | 3/2002 |
| WO | WO0249305 | 6/2002 |
| WO | 03103328 A1 | 12/2003 |
| WO | WO 2005/034438 A1 * | 4/2005 |
| WO | WO2005034438 | 4/2005 |
| WO | WO2006026090 | 3/2006 |

OTHER PUBLICATIONS

Suman Das et al.: "Dynamic Load Balancing Through Coordinated Scheduling in Packet Data Systems," IEEE Apr. 30, 2003.

Written Opinion—PCT/US2009/061703—ISA/EPO—May 10, 2010.

Taiwan Search Report—TW098136219—TIPO—Jan. 24, 2013.

* cited by examiner

WIRELESS NETWORK RESOURCE ADAPTATION

CROSS-REFERENCES TO RELATED APPLICATIONS

This application claims the benefit of U.S. Provisional Application No. 61/108,330, filed Oct. 24, 2008, entitled "Mechanisms for Adapting Wireless Network Resources to Network Traffic Load," and claims the benefit of U.S. Provisional Application No. 61/121,090, filed Dec. 9, 2008, entitled "Mechanisms for Adapting Wireless Network Resources to Network Traffic Load," each of which is incorporated herein by reference for all purposes.

BACKGROUND

Wireless communication systems are widely deployed to provide various communication services such as voice, video, packet data, messaging, broadcast, etc. These wireless systems may be multiple-access systems capable of supporting multiple users by sharing the available system resources, e.g., time, frequency, power. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of base stations that can support communication for a number of mobile terminals. The system may support operation on multiple carriers. Each carrier may be associated with a particular center frequency and a particular bandwidth. Each carrier may carry pilot and overhead information to support operation on the carrier. Each carrier may also carry data for terminals operating on the carrier. Some transmissions between a terminal and a base station may cause interference to, and may also observe interference from, other transmissions in the communication system. The interference may adversely impact the performance of all affected base stations.

Further, traffic load in the wireless communication system can impede performance of the system. Loads vary dynamically, with users coming to and leaving from the system or moving within the system over short periods of time. Further, traffic demands of users vary in time, e.g., with a user inducing a large load for a data download, but then no or little loading after that. Also, loads within the system are non-uniform. Different users may have different demands and thus induce different loading on the system. For example, one user may have a large data download requiring significant system resources while another user may have a small data demand requiring few system resources.

SUMMARY

An exemplary method of regulating data flow in a wireless communication network includes: collecting data regarding dynamic loading of sector-carrier pairs (pilots) in communication sectors of the wireless communication network; obtaining data rates for data flows of the pilots to access terminals within the wireless communication network; determining one or more pilots to use for conveying data in the wireless communication network based on the data rates and the dynamic loading; and altering data flow over the pilots by at least one of changing a data rate over at least one of the pilots or changing a combination of pilots used by the wireless communication network for conveying data to increase total data flow.

Embodiments of such a method may include one or more of the following features. The altering includes distributed network scheduling at a plurality of base transceiver stations of the network and biasing flow control rates at a base station controller of the network. The determining includes analyzing multiple network data flow options where each option includes a combination of pilots and respective data rates for the pilots, and where the altering changes a flow from a first pilot to a second pilot with a lighter load than the first pilot. The determining is based on cross-pilot interference, spatially non-uniform user demand, device partial loading performance, and load levels of the sector-carrier pairs. The determining includes analyzing combinations of pilots as selected by the access terminals, the method further including at least one of: biasing SINR measurements by at least some of the access terminals based on pilot loading and using biased SINR values by the access terminals to select pilots; or inhibiting selection by at least some of the access terminals of particular pilots based on pilot loading. The determining includes analyzing combinations of pilots as selected by the access terminals, the method further including: sending pilot loading information to the access terminals; and selecting pilots by the access terminals based on the loading information sent to the access terminals. The method further includes: sending a threshold value to the access terminals; comparing signal strengths of the pilots at the access terminals with the threshold value; and sending an indication of poor forward link quality from a first access terminal corresponding to a pilot whose signal strength differs from a strongest pilot signal strength in an active set of the first access terminal by more than the threshold value.

Also or alternatively, embodiments of the method may include one or more of the following features. The determining includes comparing total data rates of multiple network data flow options, where each option includes a combination of pilots and respective data rates for the pilots, and where the altering includes implementing the option with a highest total data rate of the multiple network data flow options. The method further includes determining cross-pilot coupling estimations using pilot strength indications from the access terminals, where determining the one or more pilots to use for conveying data uses the cross-pilot coupling estimations. Determining the cross-pilot coupling estimations further includes using measured received power and access terminal location information. The method further includes reducing power in one or more pilots based on the cross-pilot coupling estimations. The method further includes disabling one or more pilots based on the cross-pilot coupling estimations.

Also or alternatively, embodiments of the method may include one or more of the following features. The altering includes base transceiver stations exchanging loading information via a base station controller and a first base transceiver station changing data flow to a particular access terminal in response to loading information for the particular access terminal from a second base transceiver station distinct from the first base transceiver station. The collecting further includes collecting data from which data service rate, channel state, queue state, and quality of service (QoS) requirements of each pilot can be determined, and the determining analyzes a tradeoff between (1) balancing pilot load and (2) partial loading performance and loss in serving pilot instantaneous signal quality.

An exemplary computer program product includes: a processor-readable medium storing processor-readable instructions configured to cause a processor to: collect data regarding dynamic loading of sector-carrier pairs (pilots) in communication sectors of a wireless communication network; obtain data rates for data flows of the pilots to access terminals within the wireless communication network; determine one or more pilots to use for conveying data in the wireless communication network based on the data rates and the dynamic loading; and the alter data flow over the pilots by at least one of changing a data rate over at least one of the pilots or changing a combination of pilots used by the wireless communication network for conveying data to increase total data flow.

Embodiments of such a computer program product may include one or more of the following features. The instructions configured to cause the processor to determine the one or more pilots are configured to cause the processor to consider cross-pilot interference, spatially non-uniform user demand, device partial loading performance, and load balancing. The instructions configured to cause the processor to determine the one or more pilots are configured to cause the processor to consider combinations of pilots as selected by the access terminals, the instructions being further configured to cause the processor to at least one of: bias forward link SINR measurements based on pilot loading; use biased SINR values to select pilots; or inhibit selection by at least one of the access terminals of a particular pilot based on pilot loading. The instructions configured to cause the processor to alter data flow are configured to cause the processor to select pilots based on access terminal loading information. The instructions configured to cause the processor to determine the one or more pilots are configured to cause the processor to: compare signal strengths of pilots at a first access terminal with a threshold value received from a base transceiver station; and send an indication of poor forward link quality corresponding to a pilot whose signal strength differs from a strongest pilot signal strength in an active set of the first access terminal by more than the threshold value. The instructions configured to cause the processor to determine the one or more pilots are configured to cause the processor to compare total data rates of multiple network data flow options, where each option comprises a combination of pilots and respective data rates for the pilots, and wherein the instructions configured to cause the processor to alter data flow are configured to cause the processor to implement the option with a highest total data rate of the multiple network data flow options. The computer program product further includes instructions configured to cause the processor to determine cross-pilot coupling estimations using pilot strength indications from the access terminals, where the instructions configured to cause the processor to determine the one or more pilots are configured to cause the processor to use the cross-pilot coupling estimations.

An exemplary apparatus configured to regulate data flow in a wireless communication network includes: means for collecting data regarding dynamic loading of sector-carrier pairs (pilots) in communication sectors of the wireless communication network; means for obtaining data rates for data flows of the pilots to access terminals within the wireless communication network; means for determining one or more pilots to use for conveying data in the wireless communication network based on the data rates and the dynamic loading; and means altering data flow over the pilots by at least one of changing a data rate over at least one of the pilots or changing a combination of pilots used by the wireless communication network for conveying data to increase total data flow.

Embodiments of such an apparatus may include one or more of the following features. The means for altering comprises means for scheduling at a plurality of base transceiver stations of the network and means for biasing flow control rates at a base station controller of the network. The means for determining includes means analyzing multiple network data flow options where each option comprises a combination of pilots and respective data rates for the pilots. The means for determining includes means for considering cross-pilot interference, spatially non-uniform user demand, device partial loading performance, and load balancing. The means for determining includes means for analyzing combinations of pilots as selected by the access terminals, the apparatus further including at least one of: means for biasing SINR measurements by at least some of the access terminals based on pilot loading and using biased SINR values by the access terminals to select pilots; or means for inhibiting selection by at least some of the access terminals of particular pilots based on pilot loading. The means for determining includes means for comparing total data rates of multiple network data flow options, where each option comprises a combination of pilots and respective data rates for the pilots, and where the means for altering is configured to implement the option with a highest total data rate of the multiple network data flow options. The apparatus further includes means for estimating cross-pilot coupling using pilot strength indications from the access terminals, where means for determining is configured to use the cross-pilot coupling estimations to determine the one or more pilots.

An exemplary base station controller of a wireless communication system includes: a network interface configured to communicate with a wired communication network; a base transceiver station interface configured to wirelessly communicate with multiple base transceiver stations; and a scheduler configured to: collect data regarding dynamic loading of sector-carrier pairs (pilots) in communication sectors of the wireless communication network; obtain data rates for data flows of the pilots to access terminals within the wireless communication network; determine a combination of pilots to use for conveying data in the wireless communication network based on the data rates and the dynamic loading; and alter data flow over the pilots by changing data rates over the pilots and changing the pilots used in the wireless communication system according to the combination.

Embodiments of such a base station controller may include one or more of the following features. The scheduler is configured to determine the combination based on network-wide tradeoffs involving at least one of cross-pilot interference, spatially non-uniform user demand, device partial loading performance, or load balancing. The scheduler is configured to alter the data flow by sending pilot loading information via the base transceiver station interface toward base transceiver stations of the wireless communication network to bias scheduler weights at the base transceiver stations. The base station controller further includes a cross-pilot coupling module configured to produce cross-pilot coupling estimations using pilot strength indications from access terminals received via the base transceiver station interface, where the scheduler is configured to determine the combination using the cross-pilot coupling estimations. The cross-pilot coupling module is configure to produce the cross-pilot coupling estimations using measured received power and access terminal location information.

An exemplary access terminal of a wireless communication system includes: an antenna configured to transmit and receive wireless communications; a transceiver coupled to the antenna; and selecting means for selecting a pilot by selecting a sector for each carrier in an active set of the access terminal, the selecting means being configured use indications of pilot loading received via the antenna to select the sectors for the carriers in the active set.

Embodiments of such an access terminal may include one or more of the following features. The access terminal further includes measuring means for measuring SINRs of forward link signals received by the antenna, where the selecting means is configured to use the indications of pilot loading to bias the SINR measurements to form biased SINR values and use the biased SINR values to select the sectors. The selecting means is further configured to: compare signal strengths of signals received via the antenna with a threshold value received via the antenna; and eliminate any a pilot from possible selection whose signal strength differs from a strongest pilot signal strength in the active set by more than the threshold value.

An exemplary base transceiver station of a wireless communication system includes: an antenna configured for wireless communication with access terminals; a transceiver coupled to the antenna and configured to send signals to and receive signals from the antenna; a processor coupled to the transceiver and configured to analyze loading information of sector-carriers and to at least one of (1) alter sector-carrier data scheduling based on the loading information, or (2) send instructions, based on the loading information, via the transceiver toward the access terminals to inhibit selection by at least some of the access terminals of particular pilots.

Embodiments of such a base transceiver station may include embodiments where the instructions are DRC-lock indications indicating to the access terminals to unlock indicated sector-carriers.

Items and/or techniques described herein may provide one or more of the following capabilities. Network performance is improved by analyzing network resource use and demand across cells and balancing resources across the cells in accordance with dynamic and spatially non-uniform traffic loads. Indeed, spatial non-uniformity of resource demand is exploited to improve network performance. Cross-cell and cross-sector interference can be reduced and cell-edge user experience improved. Network capacity utilization can be improved and network load accommodated without providing additional network equipment. While item/technique-effect pairs have been described, it may be possible for a noted effect to be achieved by means other than those noted, and a noted item/technique may not necessarily yield the noted effect.

Figure 1:
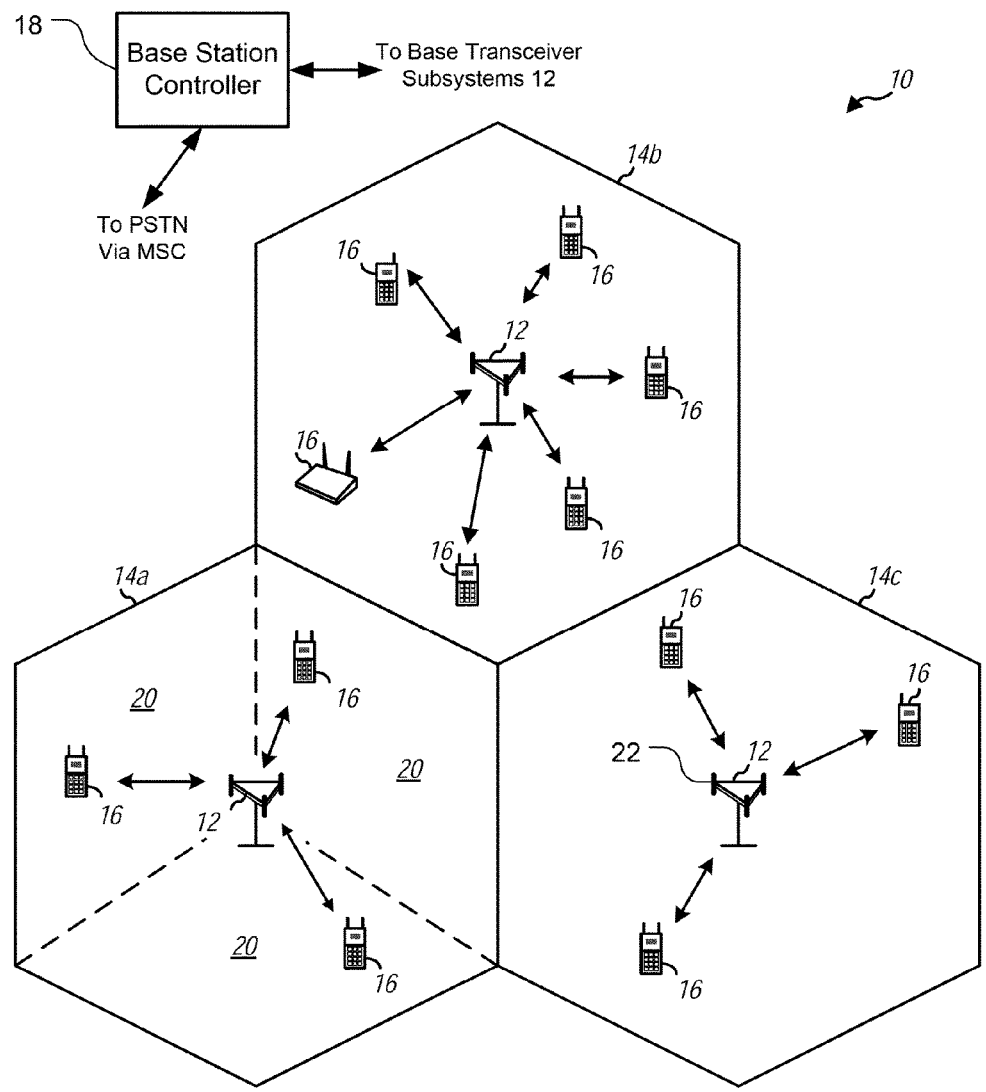
FIG. 1 is a simplified diagram of a wireless communication system, including a base station controller, base stations, and access terminals.

In the figures, components with similar relevant characteristics and/or features may have the same reference label.

DETAILED DESCRIPTION

Techniques described herein provide mechanisms for adapting wireless network resources to network traffic load. Network resources are analyzed network-wide across cells in the aggregate and spatial non-uniformities are exploited to improve network performance. Network resources across cells and sectors are re-allocated in order to improve performance. For example, a base station controller (BSC) can regulate which pilots are used to service access terminals in a wireless network, and how much data are transferred over each of the pilots. The BSC uses channel state, cross-pilot interference, and base station pilot preference information to help determine the pilots to use and their respective data loads. The BSC attempts to control the pilots used such that a more efficient data flow, with a higher data rate, is achieved. The BSC sends loading information to non-legacy access terminals that can use this information to select serving sectors for the carriers in the terminals' active sets. The BSC controls legacy access terminals to block use of undesirable sector-carriers. Non-legacy access terminals can use the loading information to block the use of inefficient carriers. Further, the BSC can control the access terminals to inhibit or prevent use by the access terminals of carriers whose strength is undesirably lower than strongest carrier in the respective active set. Cross-pilot information can be used by the BSC to help determine efficiencies of various pilot use options and to select a desirable option, e.g., with the highest efficiency of the options analyzed. Other embodiments are within the scope of the disclosure and claims.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95 and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes a 1xEV-DO system for exemplary purposes, although the techniques are applicable beyond 1xEV-DO applications.

Referring to FIG. 1, a wireless communication system 10 includes base transceiver stations (BTSs) 12, disposed in cells 14, mobile access terminals 16 (ATs), and a base station controller (BSC) 18. The system 10 may support operation on multiple carriers (waveform signals of different frequencies). Multi-carrier transmitters can transmit modulated signals simultaneously on the multiple carriers. Each modulated signal may be a CDMA signal, a TDMA signal, an OFDMA signal, a SC-FDMA signal, etc. Each modulated signal may be sent on a different carrier and may carry pilot, overhead information, data, etc. Here, the system 10 is a multi-carrier 1xEV-DO Rev. B network capable of efficiently allocating network resources.

The BTSs 12 can wirelessly communicate with the terminals 16 via an antenna 24. The BTS 12 may also be referred to as an access point, an access node (AN), a Node B, an evolved Node B (eNB), etc. The BTSs 12 are configured to communicate with the ATs 16 under the control of the BSC 18 via multiple carriers. Each of the base stations 12 can provide communication coverage for a respective geographic area, here the cell 14a, 14b, or 14c. Each of the cells 14 of the base stations 12 is partitioned into multiple (here three) sectors 20 (as shown in cell 14a) as a function of the base station antenna 22. While FIG. 1 shows the sectors 20 as being sharply defined, with the ATs being in only one sector 20 each, the sectors 20 overlap and a single AT 16 can be in multiple sectors 20 and multiple cells 14 simultaneously such that the BTSs 12 can communicate with the AT 16 through more than one sector 20 and more than one cell 14.

The system 10 may include only macro base stations 12 or it can have base stations 12 of different types, e.g., macro, pico, and/or femto base stations. A macro base station may cover a relatively large geographic area (e.g., several kilometers in radius) and may allow unrestricted access by terminals with service subscription. A pico base station may cover a relatively small geographic area (e.g., a pico cell) and may allow unrestricted access by terminals with service subscription. A femto or home base station may cover a relatively small geographic area (e.g., a femto cell) and may allow restricted access by terminals having association with the femto cell (e.g., terminals for users in a home).

The ATs 16 can be dispersed throughout the cells 14. The ATs 16 may be referred to as mobile stations, mobile devices, user equipment (UE), or subscriber units. The ATs 16 here include cellular phones and a wireless communication device, but can also include personal digital assistants (PDAs), other handheld devices, netbooks, notebook computers, etc.

Figure 2:
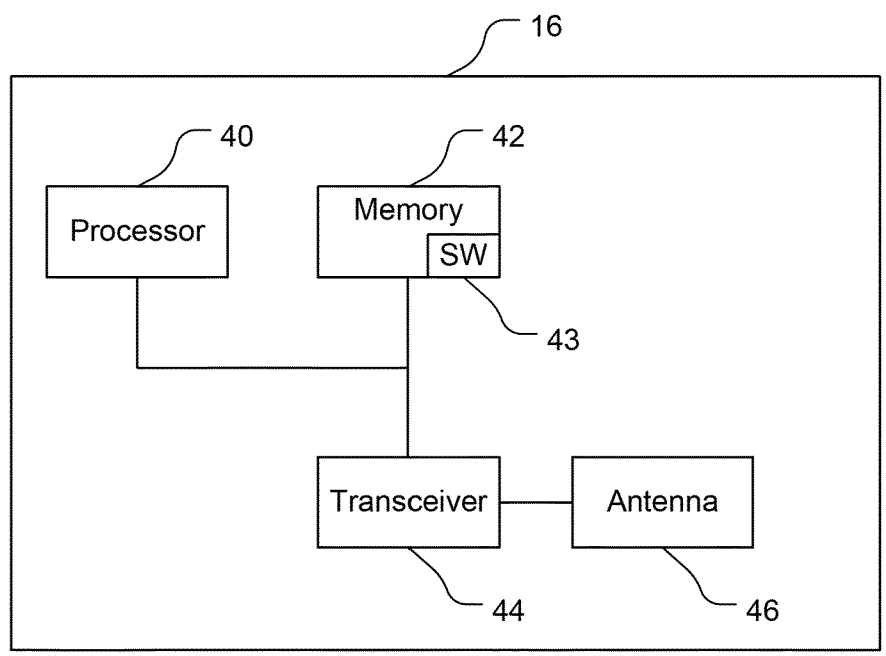
FIG. 2 is a block diagram of components of an access terminal shown in FIG. 1.

Referring also to FIG. 2, an exemplary one of the ATs 16 comprises a computer system including a processor 40, memory 42, a transceiver 44, and an antenna 46. The transceiver 44 is configured to communicate bi-directionally with the BTS 12. The processor 40 is preferably an intelligent hardware device, e.g., a central processing unit (CPU) such as those made by Intel® Corporation or AMD®, a microcontroller, an application specific integrated circuit (ASIC), etc. The memory 42 includes random access memory (RAM) and read-only memory (ROM). The memory 42 stores computer-readable, computer-executable software code 43 containing instructions that are configured to, when executed, cause the processor 40 to perform various functions described herein. Alternatively, the software 43 may not be directly executable by the processor 40 but is configured to cause the computer, e.g., when compiled and executed, to perform the functions.

The ATs 16 can communicate with the base stations 12 via forward and reverse links using an active set of carriers. The forward link (or downlink) refers to the communication link from the base station 12 to the terminal 16, and the reverse link (or uplink) refers to the communication link from the terminal 16 to the base station 12. The active set of carriers is the set of carriers for which communication with a base station 12 has been determined to be possible to a satisfactory degree. The active set can include sector-carrier pairs (pilots) corresponding to the base stations 12 that will decode transmissions from the AT 16 on the uplink and which can be selected by the AT 16 to receive downlink transmissions. In 1xEV-DO Rev. B networks, soft-handoff terminals 16 select one sector for each carrier from the active set to receive downlink communications. By contrast, on the reverse link, each sector in a terminal's active set will attempt to decode its reverse link transmissions.

The ATs 16 designate respective BTSs 12 for each of the carriers within the ATs' active sets of carriers. Each of the ATs 16 determines and selects, e.g., using a data rate control (DRC) signal, one of the BTSs 12 for each of its active set carriers. The selection is typically based upon which BTS 12 provides the best signal to interference-plus-noise ratio (SINR).

Figure 3:
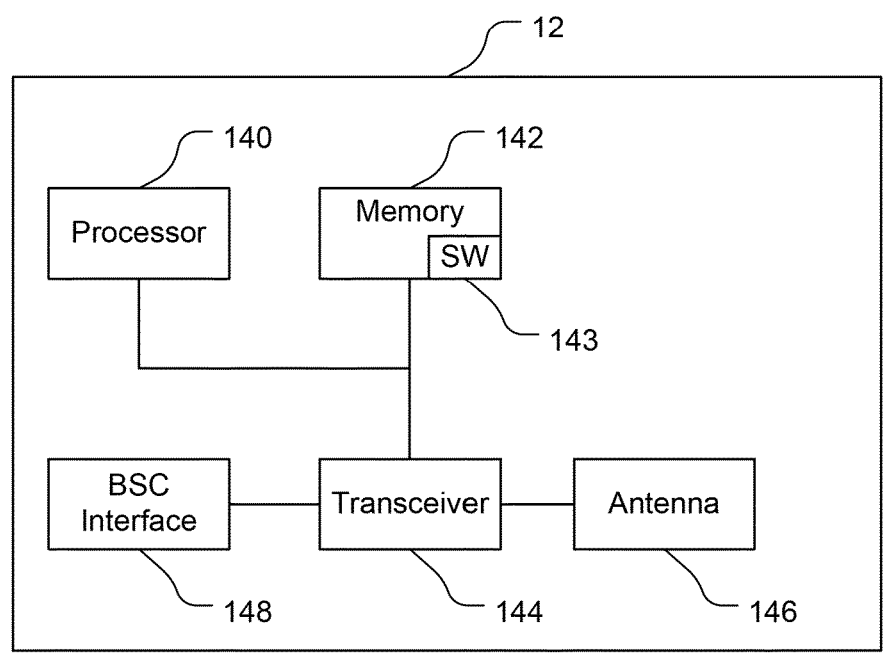
FIG. 3 is a block diagram of components of a base transceiver station shown in FIG. 1.

Referring also to FIG. 3, an exemplary one of the BTSs 12 comprises a computer system including a processor 140, memory 142, a transceiver 144, an antenna 146, and a BSC interface 148. The transceiver 144 is configured to communicate bi-directionally with the ATs 16. The processor 140 is preferably an intelligent hardware device, e.g., a central processing unit (CPU) such as those made by Intel® Corporation or AMD®, a microcontroller, an application specific integrated circuit (ASIC), etc. The memory 142 includes random access memory (RAM) and read-only memory (ROM). The memory 142 stores computer-readable, computer-executable software code 143 containing instructions that are configured to, when executed, cause the processor 140 to perform various functions described herein. Alternatively, the software 143 may not be directly executable by the processor 140 but is configured to cause the computer, e.g., when compiled and executed, to perform the functions. The BTS 12 is connected and configured for bi-directional communication with the BSC 18. Typically, as here, the BSC 18 is hardwired to the BTSs 12. The BTS 12 is configured to convey, receive, encode, and decode transmissions to and from the BSC 18 using the transceiver 144 via the BSC interface 148. The BTS 12, through the processor 140 and the software code 143, implements, among other things, a scheduler to route data over pilots to the ATs 16 within the BTS's cell 14.

The traffic load in the network 10 changes dynamically across the sectors and carriers as the ATs move and/or turn on/off applications. Data demand in the network 10 is intrinsically non-uniform, leading to chokepoint sectors or pilots and time variations so that which sectors or pilots are chokepoints change over time. A chokepoint sector operates at or close to a maximum tolerable or desired level for that sector 20. It has been found that typically there exists only a small portion of sectors 20 that are chokepoints at any given time and that chokepoint sectors typically have several lightly-loaded neighbor sectors. Neighbor sectors may not be adjacent physically, but are similar in a radio frequency (RF) sense as to the quality of communications available to a particular AT 16.

Figure 4:
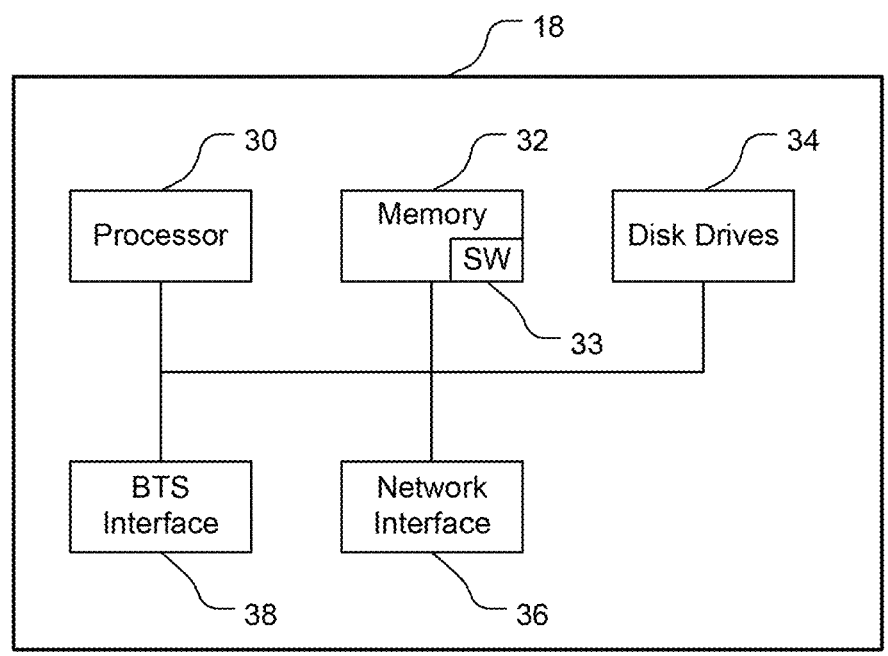
FIG. 4 is a block diagram of components of the base station controller shown in FIG. 1.

Referring also to FIG. 4, the BSC 18 comprises a computer system including a processor 30, memory 32, disk drives 34, a network interface 36, and a BTS interface 38. The BTS interface 38 includes the transmitter and receiver for transmitting, receiving, encoding, and decoding transmissions between the BSC 18 and the BTSs 12. The processor 30 is preferably an intelligent hardware device, e.g., a central processing unit (CPU) such as those made by Intel® Corporation or AMD®, a microcontroller, an application specific integrated circuit (ASIC), etc. The memory 32 includes random access memory (RAM) and read-only memory (ROM). The disk drives 34 include a hard-disk drive and can include floppy-disk drives, a CD-ROM drive, and/or a zip drive. The network interface includes appropriate hardware for bi-directional communication to and from a mobile switch center (MSC) that is in communication with a phone network such as a public-switched telephone network (PSTN). The BSC 18 is connected and configured for bi-directional communication with the BTSs 18. The BSC 18 is configured to convey, receive, encode, and decode transmissions to and from the BTSs 12 using the BTS interface 38 and the processor 30.

The BSC 18 stores, e.g., in the memory 32, computer-readable, computer-executable software code 33 containing instructions that are configured to, when executed, cause the processor 30 to perform functions described below (although the description may read that the software 33 performs the function(s)). Alternatively, the software 33 may not be directly executable by the processor 30 but is configured to cause the computer, e.g., when compiled and executed, to perform the functions. The functions implement mechanisms for improving network performance through adapting network resources to network traffic load. The software 33 can be loaded onto the BSC 18, e.g., by being downloaded via a network connection, uploaded from a disk, etc.

Smart Flow Routing

There are often multiple transmit paths for delivering traffic to the ATs 16, e.g., via multiple carriers, via multiple sectors 20 in the same carrier, or from multiple BTSs 12. Thus, a choice can be made about which transmit path or paths to use to serve the AT 16. When there is also heterogeneity in the link quality and/or shared resource availability across the transmit paths to the same AT 16, then a choice can be made about the aggregate set of servicing paths or flow routes to satisfy the AT's data demand. The usage of a particular flow route for one AT 16 may have an impact on the performance of other ATs 16 due to interference. Thus, the joint selection of flow routes for the ATs 16 may have a fundamental impact on overall performance of the network 10.

Smart flow routing attempts to route flows away from heavily-loaded pilots, i.e., chokepoints, to lesser-loaded pilots that preferably interfere only slightly with the pilots that were heavily loaded, and to use multiple available paths in an efficient way, and preferably the most efficient way possible given the constraints of the network. This is performed using a combination of distributed network scheduling at each BTS 12 and biasing flow control rates at the BSC 18 for sending data to multiple pilots serving an AT 16. Further, each AT 16 may use information from the BSC 18 to send indications of poor link quality (null DRC in EV-DO systems) for inefficient pilots so that the AT 16 gets served on more efficient pilots.

Figure 5:
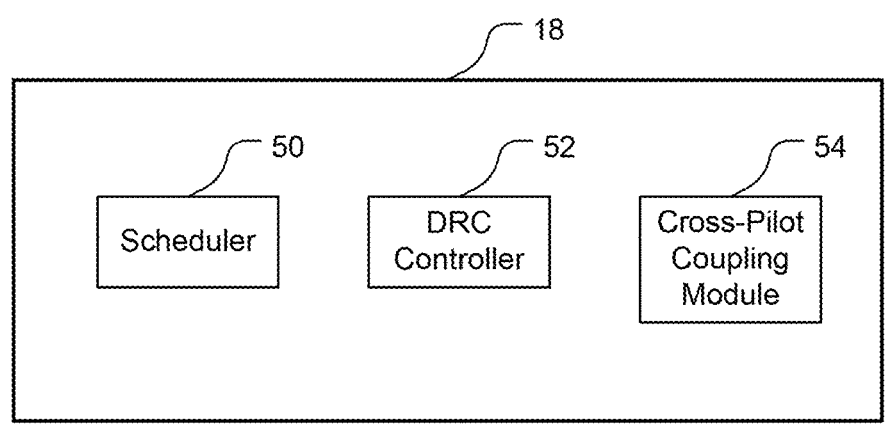
FIG. 5 is a block diagram of functional components of the base station controller shown in FIG. 1.

Referring to FIG. 5, the BSC 18 includes a scheduler 50. The scheduler 50 is configured to determine and select the BTSs 12 to serve each of the ATs 16. The BSC 12 can cause multiple BTSs 12 to communicate with a single AT 16. As the BSC 18 does not know in advance what the demands of each AT 16 will be, or what ATs 16 will stop needing service or what new ATs 16 will start needing service, the BTSs 12 will have uneven and perhaps less-than-desired loading, with some BTSs 12 being near capacity and other BTSs 12 being far from capacity.

Figure 6:
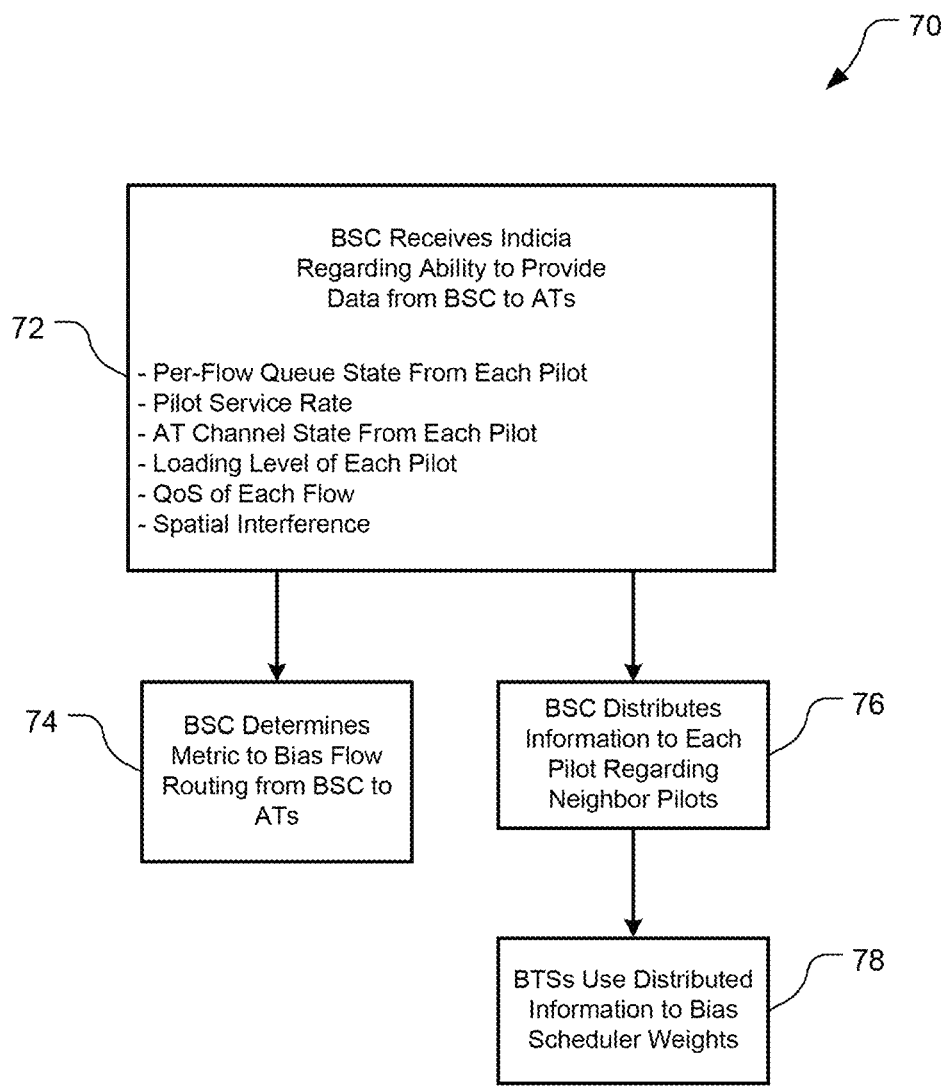
FIG. 6 is a block flow diagram of a process of flow routing.

Referring to FIG. 6, with further reference to FIGS. 1 and 5, a process 70 of providing smart flow routing includes the stages shown. The process 70 is, however, exemplary only and not limiting. The process 70 can be altered, e.g., by having stages added, removed, or rearranged. For example, while the process 70 is discussed as being implemented primarily by the BSC 18, the analysis and decisions described may be performed/made at the BSC 18, the ATs 16, or both the BSC 18 and the ATs 16. With the process 70 of smart flow routing, the BSC 18 controls which BTSs 12 serve which ATs 16 based on factors in addition to total load on the ATs 16.

At stage 72, the scheduler 50 receives indicia regarding the ability to provide data to the ATs 16. Preferably, the scheduler 50 receives data from which it can determine per-flow queue state, pilot service rate, AT channel state, loading level, quality of service (QoS) requirements of each flow, and spatial interference between pilots to help the scheduler 50 decide which pilots to use to serve the ATs 16 and at what data rates. The scheduler 50 receives feedback from the BTSs 12 as to the per-flow queue state of each pilot. The BSC 18 directly measures the service rates of each network flow in each pilot. The ATs 16 directly measure the AT channel states from each pilot and periodically send average AT channel state information to the BSC 18. This information includes indicia of forward link SINRs for respective pilots received at the ATs 16. In 1xEV-DO these indicia of the received SINRs are the data rate control (DRC) signals. The BTSs 12 can filter the signals for the respective ATs 16 that the BTSs 12 serve and send the filtered information to the BSC 18, or each AT 16 can send the DRC signals to the BSC 18 directly. The BTSs 12 track the forward link data rate averaged over several seconds for each pilot for each AT 16 that the BTSs 12 serve. The BTSs 12 report these averages to the BSC 18. The loading is measured at each pilot according to:

$$Neff_{s,c,t} = IIR\left\{\sum_{\substack{m \in Set\ of\ ATs \\ pointing\ to\ s,c\ at\ t}} I_{Q_{m,t}}\right\}, I_{Q_{m,t}} = \begin{cases} 1, & \text{if } Q_{m,t} > 0 \\ 0, & \text{otherwise} \end{cases} \quad (1)$$

where $Neff_{s,c,t}$ is the effective load for sector s, carrier c, at time t. Backhaul bandwidth limitations of the network 10 can also be included in the load measure. The spatial interference provides a measure of cross-coupling across pilots, and is discussed further below.

At stage 74, the scheduler 50 determines a metric to bias the flow control rate across the pilots that serve respective ATs 16. The scheduler 50 uses the available data collected at stage 72 to decide which set of pilots and at what data rates to route packets for each flow in order to provide data to the ATs 16. Further, the BSC 18 accounts for cross-pilot interference and load balancing by using pilot coupling (discussed further below) and flow service rate estimates. The scheduler 50 preferably uses all the available data to make its determination based on data rate expectations, both as to needs and availabilities. The scheduler 50 analyzes various options of data flow combinations and makes its decision as to which option to implement with a goal being to provide data to the ATs 16 efficiently, e.g., at the highest cumulative rate possible within the existing constraints, thus better utilizing available resources. An option may be analyzed by evaluating a whole option, or by evaluating a portion of the option that is different relative to another option. The scheduler 50 could, for example, decide to distribute incoming data proportional to the loading levels of the pilots, but a more efficient use will often be possible. The scheduler 50, for example, will likely route data from a first pilot to a second pilot that interferes little (or at least less than a third pilot) with the first pilot. Stage 74 is performed in conjunction with, and possibly concurrently with, stages 76 and 78 discussed below.

At stage 76, the BSC 18 distributes data collected at stage 72 to the BTSs 12. The BSC 18 sends information to each pilot informing the pilot about its neighbor pilots. The neighbor pilots may be at different BTSs 12 and thus this mechanism uses the BSC 18 as a relay for passing information across pilots residing at distinct BTSs 12, given that the BTSs 12 do not communicate directly with each other. For each AT 16, the BSC 18 conveys the average forward link data rate to each serving pilot for that AT 16.

At stage 78, the BTSs 12 in a distributed manner use the information from the BSC 18 provided at stage 76 to further adjust data flow. Each BTS 12 computes a flow routing metric, or scheduler waiting, for each of the ATs 16 that the BTS 12 is serving for use in scheduling data flow to the ATs 16. For example, the BTS 12 can compute a weighting according to:

$$w_{s,c,m,t} = \left( \frac{\overline{d}_{s,c,m,t}}{\left( \prod_{(ss,cc) \in All\ sector-carriers\ serving\ AT\ m} \overline{d}_{ss,cc,m,t} \right)^{\frac{1}{N}}} \right)^{\beta} \cdot \frac{d_{s,c,m,t}}{\overline{r}_{s,c,m,t}} \quad (2)$$

where: $w_{s,c,m,t}$ is the scheduler weight for sector s, carrier c, for AT m, at time t; $\overline{d}_{s,c,m,t}$ and $d_{s,c,m,t}$ are the average an instantaneous forward link data rates for AT m, in sector s, on carrier c, at time t; $\overline{r}_{s,c,m,t}$ is the average throughput of AT m, in sector s, on carrier c, at time t, $\beta$ is a network-wide fairness parameter ($\beta > 0$), and N is the number of sector-carriers serving AT m. Equation (2) uses the average forward link data rate on a sector-carrier divided by the sum of average DRCs across all serving sector-carriers for the AT 16. The BTS 12 serves the AT 16 with the highest scheduler weight on each sector-carrier.

Figure 7:
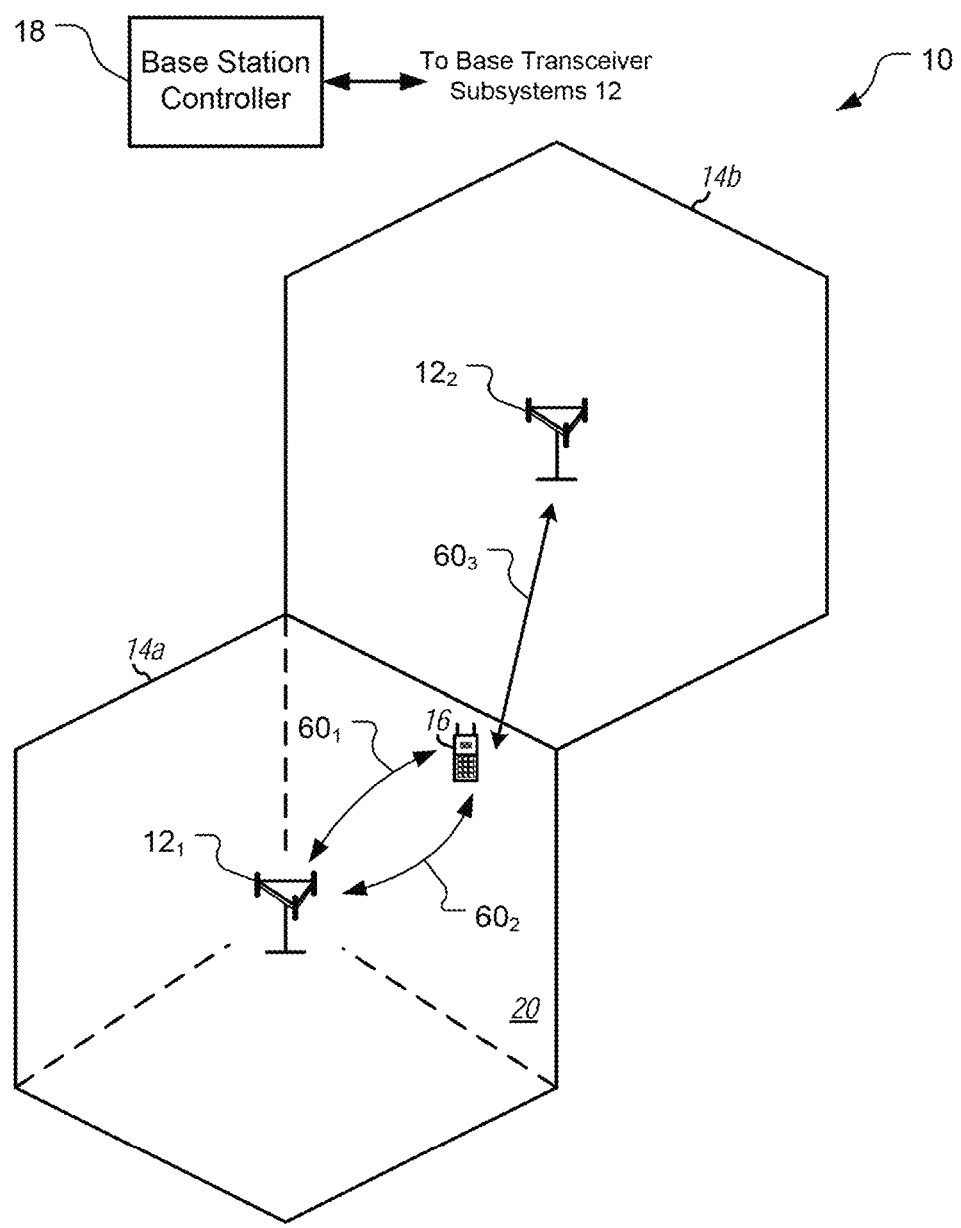
FIG. 7 is a simplified diagram of a portion of the wireless communication system shown in FIG. 1, showing pilot signals.

The process 70 routes data flows away from heavily loaded pilots (chokepoints). Preferably, the data are routed to flows that do not significantly interfere with the heavily loaded pilots, and the multiple paths are used in a highly efficient combination. For example, referring to FIG. 7, suppose a BTS 12$_1$ serves an AT 16 at the cell edge with pilots 60$_1$ and 60$_2$, and a BTS 12$_2$ serves the same AT 16 with another pilot 60$_3$. If the pilot 60$_1$ is more heavily loaded than the pilot 60$_2$ and they have similar SINRs (e.g., iv the pilot 60$_1$ is a ubiquitous carrier and the pilot 60$_2$ is a hotspot carrier), then the BSC 18 may instruct the BTS 12$_1$ to serve the AT 16 using the pilot 60$_2$ exclusively, or at least more heavily than the pilot 60$_1$. Alternatively, if the BSC 18 further determines that the pilot 60$_3$ has a lower SINR than either of the pilots 60$_1$, 60$_2$, but is so lightly loaded that the pilot 60$_3$ can provide better data rate despite its lower SINR, then the BSC 18 can direct the data through the BTS 12$_2$ instead of the BTS 12$_1$. The example shown in FIG. 7 is for illustrative purposes. Many other situations are possible, e.g., where flow is not routed to a different cell, where flow is routed to a different sector, or where flow is routed to a different pilot within the same sector. Still other examples and situations are possible. Further, instead of the BSC 18 making the decision, the BSC 18 can pass the raw information, e,g, loading, AT channel state, etc. to the BTS 12 and the BTS 12 can determine the efficient route for serving the ATs 16 in a distributed manner by using the information from the BSC 18.

Further, referring to FIG. 1, the cell 14$b$ may be a chokepoint, as there are many ATs 16 being served. The process 70 can offload service from the BTS 12 in the cell 14$b$ to a neighboring cell, for example by transferring ATs 16 at cell edges to neighboring sectors. Also, offloading sectors adjacent to chokepoint sectors reduces interference in the chokepoint sectors. Reducing load in chokepoint sectors can improve the chokepoint sector's capacity and improve the user's experience in that sector. This dynamic spatial isolation and dynamic flow routing can increase overall network capacity.

Further, the BTSs 12 can perform distributed network scheduling. The BTSs 12 can schedule data delivery to the ATs 16 in cooperation with other BTSs 12 instead of independently. The cooperation is distributed in that the cooperation is not centralized. The BTSs 12 periodically (e.g., every 2-3 seconds) convey their loading information to neighboring BTSs 12 through the BSC 18 as the BTSs 12 do not communicate directly with each other. The BTSs 12 send the loading levels and channel states for the ATs 16 that they are serving to the neighboring BTSs 12. Then, the BTSs 12 can bias the scheduling weights for data delivery to their respective ATs 16. Thus, in a distributed manner, each BTS 12 can account for the service to a particular AT 16 from other BTSs 12 in addition to itself.

Thus, smart flow routing (BSC scheduling) includes two components. One component is the decision by the BSC 18 how to distribute data among available pilots for a given AT 16. The BSC 18 can also pass the raw information for this to the BTSs 12, and the BTSs 12 can use this to bias their flow control requests to the BSC 18. Another component is the BTSs 12 weighting the scheduling of data to the given AT 16 based on the channel state and loading level for each of the other pilots serving the given AT 16, including other pilots provided by one or more other BTSs 12. Network resource utilization can be improved on an average basis.

Smart flow routing can be used in conjunction with other scheduler policies implemented for each pilot, and even if pilot schedulers are coordinating across carriers within a sector. The BSC 18 may use the BTS scheduler policies to determine expected flow service rates and to help decide how to relieve choke points.

AT-Controlled Access Terminal Pointing

Figure 8:
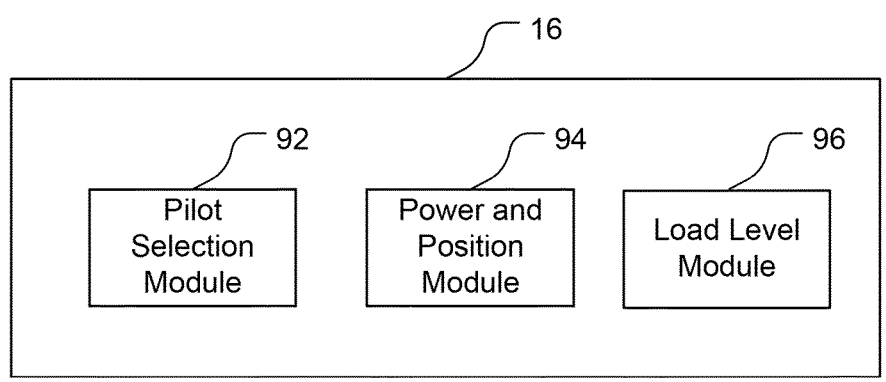
FIG. 8 is a block diagram of functional components of an access terminal shown in FIG. 1.
Figure 9:
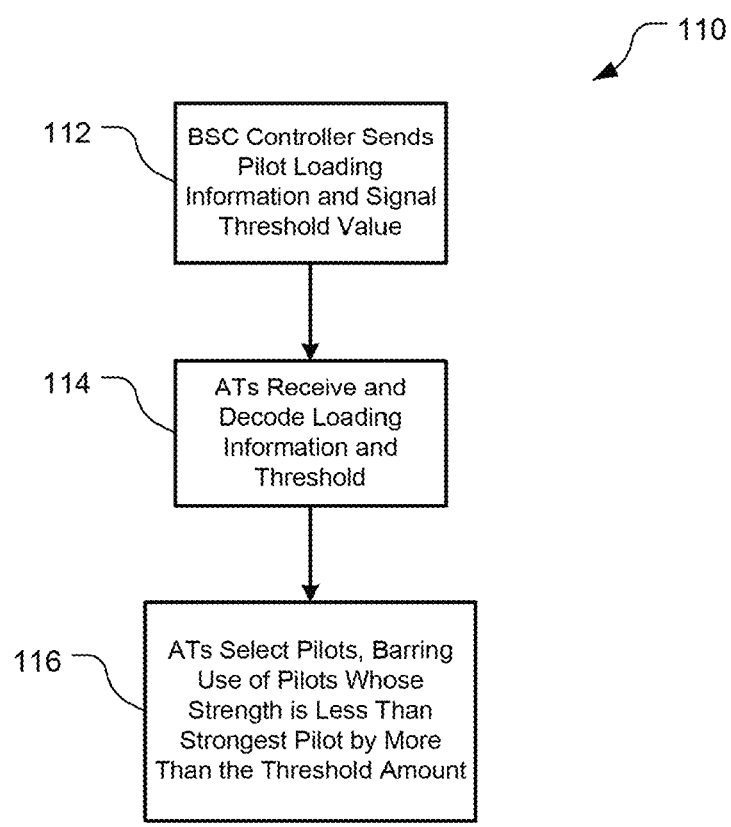
FIG. 9 is a block flow diagram of a process of access terminal sector selection.

Referring to FIG. 9, with further reference to FIGS. 1, 5 and 8, a process 110 of providing AT-controlled, BSC-assisted AT pointing includes the stages shown. The process 110 is, however, exemplary only and not limiting. The process 110 can be altered, e.g., by having stages added, removed, or rearranged. For example, in addition to, or instead of, the BSC 18 providing loading information as discussed below, this information could be provided by the BTSs 12. With the process 110 of AT pointing control, the BSC 18 provides information for use by the ATs 16 in controlling which BTSs 12 the ATs 16 will select for service based on information in addition to SINR at the ATs 16. The ATs 16 work in conjunction with the BSC control of resource preference schemes at each BTS pilot scheduler discussed above with respect to FIG. 6.

At stage 112, the controller 52 sends information about pilot loading levels to the ATs 16. The controller 52 collects pilot loading information (stage 72 of FIG. 6) and broadcasts this information (using the BTS interface 38, FIG. 4) to the ATs 16. Additionally, the controller 52 sends a threshold value to be used by the ATs 16 to compare relative pilot strengths across pilots in each AT's active set. Typical threshold values are 3 dB or 4 dB.

At stage 114, the non-legacy ATs 16 receive and decode the pilot loading information and the threshold value. For each such AT 16, the load level module 96 interprets the load level signal and the threshold value broadcast by the BSC 18 and provides this information to the pilot selection module 92.

At stage 116, the module 92 uses the pilot load level information value to help determine which combination of pilots will provide a desirable (e.g., possibly optimal given the conditions) set of pilots for data flow. The pilot selection module 92 analyzes the information regarding load level and measured SINRs of forward link carriers. The module 92 determines which sector to use for each carrier by evaluating the tradeoff between (1) balancing pilot load and (2) partial loading performance and loss in serving pilot instantaneous signal quality similar to that discussed above.

Further, the pilot selection module 92 uses the threshold value to help determine the combination of pilots to use. The module 92 determines the relative pilot strengths of all the carriers in the AT's active set as compared to the pilot in the active set with the best strength. For any pilot whose relative strength is weaker than the best pilot strength by an amount greater than the threshold value sent by the BSC 18, and only any such pilots, the module 92 sends an indication of poor forward link quality to the BSC 18. In EV-DO systems, this indication is called a null DRC control signal. This signal indicates to the BTS 12 and the BSC 18 that the respective pilot is unacceptably poor and thus unavailable for use to communicate with the particular AT 16. The BTS 12 does not schedule an AT 16 on a forward link pilot for which the BTS 12 has received a null DRC for non-QoS traffic. Thus, the AT 16 can receive service only from a subset of pilots when there exists a large differential in pilot strength across the pilots in the AT's active set. Using this threshold value inhibits the AT 16 from eliminating pilots from use that have strengths close to the strongest pilot, and thus able to provide desirable data service.

Cross-Pilot Coupling Estimation

Figure 10:
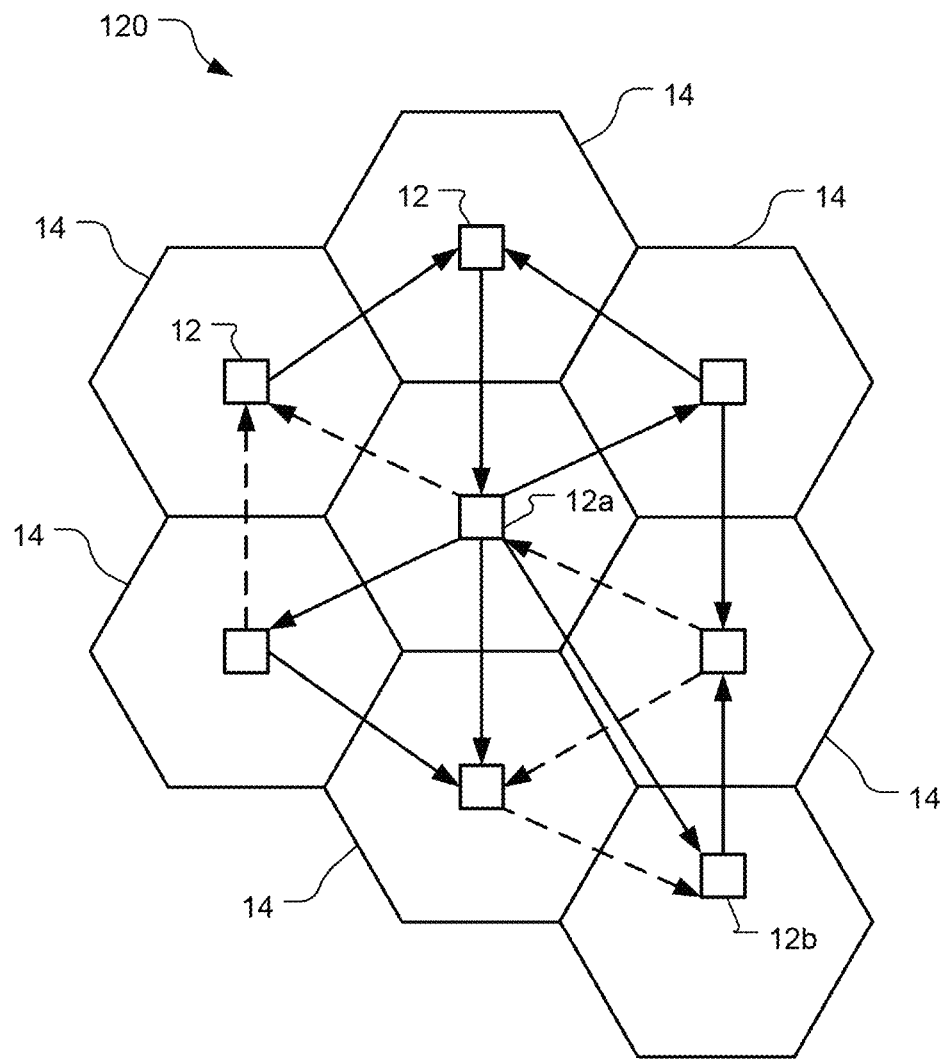
FIG. 10 is an exemplary, simplified cross-pilot spatial interference map.

Referring to FIGS. 5 and 10, the BSC 18 further includes a cross-pilot coupling module 54. The module 54 is configured to analyze coupling between pilots and develop a topological spatial interference map 120 of pilot-to-pilot interference for use in smart-flow routing. The spatial-interference map 120 shows interference at pilots from neighbor pilots on the same channel, here the same CDMA channel. As shown, the neighbors are close in an RF or interference sense, even though they may be separated significantly in distance. For example, BTSs 12a and 12b are neighbors, despite being physically separated by other cells 14. The map 120 is relatively static and changes due to long-term topology changes, e.g., new buildings, etc.

Figure 11:
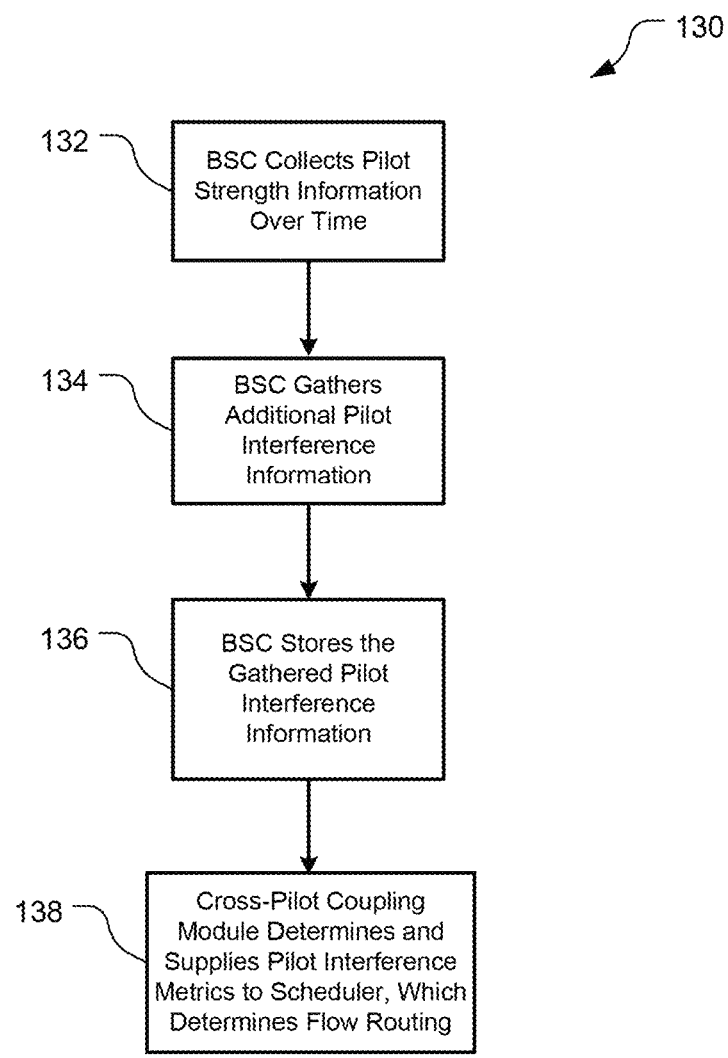
FIG. 11 is a block flow diagram of a process of generating and using the interference map shown in FIG. 10.

Referring to FIG. 11, with further reference to FIGS. 1, 5 and 10, a process 130 of developing the topological pilot-to-pilot interference map 120 includes the stages shown. The process 110 is, however, exemplary only and not limiting. The process 110 can be altered, e.g., by having stages added, removed, or rearranged. For example, stage 134 discussed below may be removed. Further, although the map 120 is shown and discussed, this is for illustrative purposes as different maps may be produced by the method 130. The process 130 is described as being performed by the BSC 18, but the process could be performed in a distributed manner by the BTSs 12, or offline, perhaps offsite from the network 10, and perhaps in a batch mode.

At stage 132, data are collected and processed for use in preparing the map 120. As ATs 16 near cell edges, they provide pilot strength information for handoff purposes, e.g., when forward link SINR falls below a threshold. The cross-pilot coupling module 54 tracks pilot strengths over time from pilot strength signals received from the ATs 16, in EV-DO the route update signals. The module 54 collects values of Ec/Io, i.e., the ratio of pilot signal energy to total received energy. The module 54 can use knowledge of pilot strength interplay (e.g., as strength in one sector weakens, the strength in another sector grows) to determine interference. For each (serving sector-carrier, non-serving sector-carrier) pair reported by the ATs 16 (in the route update message), the module 54 generates an other-sector/serving-sector Ec ratio. For each non-serving sector-carrier not included in the information from the ATs 16, an Ec ratio of 0 is used for the serving sector. The module 54 averages the Ec ratios weighted by sector-carrier transmit power for a long time interval, e.g., several hours, greater than a day, greater than two days, about a week, etc. The module 54 thus develops estimates for relative pilot strength coupling, including directionality of the interference as indicated by arrows in the map 120. The map 120 provides average (e.g., over a week) interference indications. The strengths of the interference are indicated in the map 120 by solid lines (higher strength) and dashed lines (lower strength). Two interference strengths are shown for illustrative purposes, as the actual or relative strengths could be determined on a much finer basis as desired.

At stage 134, the pilot-coupling module 54 gathers additional AT information. Here, the module 54 gathers measured receive power and AT GPS location for a large number of representative AT locations within the cells 16. The module 54 processes this information to form a better estimate of pilot strength coupling and directionality.

At stage 136, the module 54 stores the pilot coupling information developed at stages 132 and/or 134. The module 54 may not prepare the actual map 120, but does store the information from which such a map could be generated. For each carrier, the module 54 stores a value indicating interference magnitude for each servicing sector and non-serving sector pair. The stored value is, e.g., the average value of the Ec ratio as seen by ATs 16 served by the serving sector 20 averaged over the set of such reporting ATs 16. In the case of distributed BTS calculation, each BTS 12 computes this value for each serving sector-carrier using forward link signal strength information from the BSC 18 (e.g., from route update signals from the ATs 16).

At stage 138, the cross-pilot coupling module 54 calculates interference metrics and provides its topological interference information to the scheduler 50. The module 54 determines an interference metric for each sector-carrier. For example, the interference metric may be the sum, over all ATs 16 served by a sector-carrier, of the average Ec/Io of non-serving sector-carriers divided by the average Ec/Io of serving sector-carriers. The scheduler 50 uses this information to assist its determination of which pilots to use to serve the ATs 16, e.g., what data rates are available and which combination of pilots will improve, if not maximize, efficiency in the network 10.

BSC Control of Resource Preferences

Referring to FIG. 5, the cross-pilot coupling module 54 is configured to implement an adaptive reuse function to help adjust the resource preferences of the BTSs 12. The coupling module 54 distributes the topological interference map 120 information to the BTSs 12 so that they can determine preferred pilots for the ATs 16. The BTSs 12 use the interference information to reduce transmit power on capacity carriers (preferably not on coverage carriers) or to disable carriers completely. For example, a BTS 12 may decide to reduce power by 3 dB, 6 dB, or to disable. Preferably, the BTSs 12 do not reduce power more than 6 dB if the carrier is not to be disabled. The power reduction will apply for the pilot, MAC, and data portions of signals. The BTSs 12 are biased toward power reduction, preferring to disable carriers to the extent this is acceptable. The reuse function is distributed, with each BTS 12 determining when it should reduce transmit power or disable one or more sector-carriers. The sector-carrier power reductions and/or sector-carriers are reported to the BSC 18 for use in determining the flow routing, e.g., at stage 76 shown in FIG. 6 and discussed above.

The various illustrative logical blocks, modules, circuits, and algorithm steps described in connection with the disclosure herein may be implemented as electronic hardware, computer software executed by a processor, or combinations of both. To clearly illustrate this interchangeability of hardware and software, various illustrative components, blocks, modules, circuits, and operations have been described above generally in terms of their functionality. Whether such functionality is implemented as hardware or software (executed by a processor) depends upon the particular application and design constraints imposed on the overall system. The described functionality may be implemented in varying ways for each particular application, but such implementation decisions should not be interpreted as causing a departure from the scope of the disclosure.

BSC-Controlled Access Terminal Pointing

The ATs 16 can use pointing mechanisms such as DRC pointing control to enhance the ability of the BSC 18 to perform smart flow routing. Typically, ATs 16 choose the sector 20 with the highest forward link SINR for each carrier to be the serving sector 20 for that carrier, thus establishing the pilots (carrier-sector combinations). Under AT DRC control, however, the BSC 18 influences the selection by the ATs 16, indicated by the DRC signals, by accounting for information in addition to SINR at the ATs 16 from which the BSC 18 can determine net resources that an AT 16 can receive. The BSC 18 uses more information, than traditional techniques, to try to determine an efficient use of network resources, preferably the best combination of resources to yield the best overall data rate given the system constraints. The result is that an AT 16 may be served by a pilot whose forward link SINR is worse than another available pilot, but whose loading is lighter.

Referring again to FIG. 5, the BSC 18 further includes a controller 52 (in this EV-DO example, a DRC controller) configured to collect information in addition to SINR at the ATs 16. In particular, the controller 52 collects queue state information available from the scheduler 50 regarding flow control. Alternatively or additionally, the controller 52 can collect additional information including pilot loading information from the BTSs 12, information about current AT locations in the network in terms of channel quality to visible pilots, and/or position of the ATs 16. For example, information regarding pilot strength can be collected, with such information being contained in Route Update messages in DO systems. In another example, referring also to FIG. 8, each AT 16 includes a power and position module 94 that measures the power of received pilot signals periodically sends a message that contains (1) measured receive power from each pilot and (2) global positioning system (GPS) location of the AT 16. Preferably, the controller 52 collects information about all of queue state, pilot loading, channel quality to visible pilots, and AT location. The controller 52 can broadcast the loading level of pilots to the ATs 16.

The controller 52 is configured to control the selection of serving sectors by the ATs 16 to provide an efficient selection of sectors by the ATs 16. The BSC 18 considers a tradeoff between (1) balancing pilot load and (2) partial loading performance and loss in serving pilot instantaneous signal quality. The selection of a lighter-loaded, worse forward link SINR pilot will yield a higher data rate than use of a higher-loaded yet better forward link SINR pilot if the loading differential outweighs the SINR degradation. The partial loading performance refers to the difference in interference seen by pilot signals versus data traffic. Pilot signals (test signals, not sector-carrier pairs) are transmitted simultaneously for the ATs 16 to determine SINR for selecting sectors. This interference may be higher than for data traffic, especially as seen by a first sector if a second, neighboring, sector is lightly loaded. As the load is shifted to the second sector, the interference induced by data traffic in the second sector on the first sector increases. Thus, as traffic is moved from the first sector to the second sector, the desirability of shifting more traffic decreases due to the more balanced load, and due to the increasing interference by doing so. The controller 52 thus controls the offloading of traffic while monitoring the changes in interference induced by doing so, and controls the traffic to inhibit the interference from increasing so much that the overall efficiency of the network decreases. Also, the serving pilot instantaneous signal quality decreases because the controller 52 is causing an AT 16 to use a sector with a poorer SINR for a particular carrier and while lower SINR coupled with more time slots on the carrier may result in better data performance, the decrease in SINR is also monitored to inhibit decreases in overall network efficiency and to inhibit use of a SINR below an acceptable level.

The BSC 18 is configured to provide AT DRC control for both non-legacy and legacy ATs 16. A non-legacy AT 16 includes a load level module 96 that can decode and interpret information in the broadcast message from the BSC 18 regarding loading level and bias the AT's sector selection, e.g., by biasing the measured SINRs using the loading information and selecting sectors using the biased SINRs. A legacy AT 16 cannot decode and understand the broadcast loading message from the BSC 18. For legacy ATs 16, the BSC 18 can select ATs 16 and force these ATs 16 to point to sectors 20 different from the sectors 20 that the ATs 16 would point to absent influence by the BSC 18.

The controller 52 can send a DRC-lock signal to the legacy ATs 16 to control to which sectors the ATs 16 can point for a given carrier. The DRC-lock channel is a one-bit indication regarding the reverse link quality. If the DRC-lock is set to "unlock," then the reverse link quality for the corresponding carrier-sector pair is poor, and thus unacceptable. If the DRC-lock is set to "lock," then the reverse link quality (SINR) for the corresponding carrier-sector pair is good, and thus usable/reliable for decode purposes and acceptable for the AT 16 to point to this reverse link. Each of the ATs 16 includes a pilot selection module 92 configured to select carrier-sector pairs. Before the pilot selection module 92 selects a sector for a given carrier, the module 92 confirms that the reverse link quality for the instant carrier-sector pair is acceptable by analyzing the DRC-lock bit.

Figure 12:
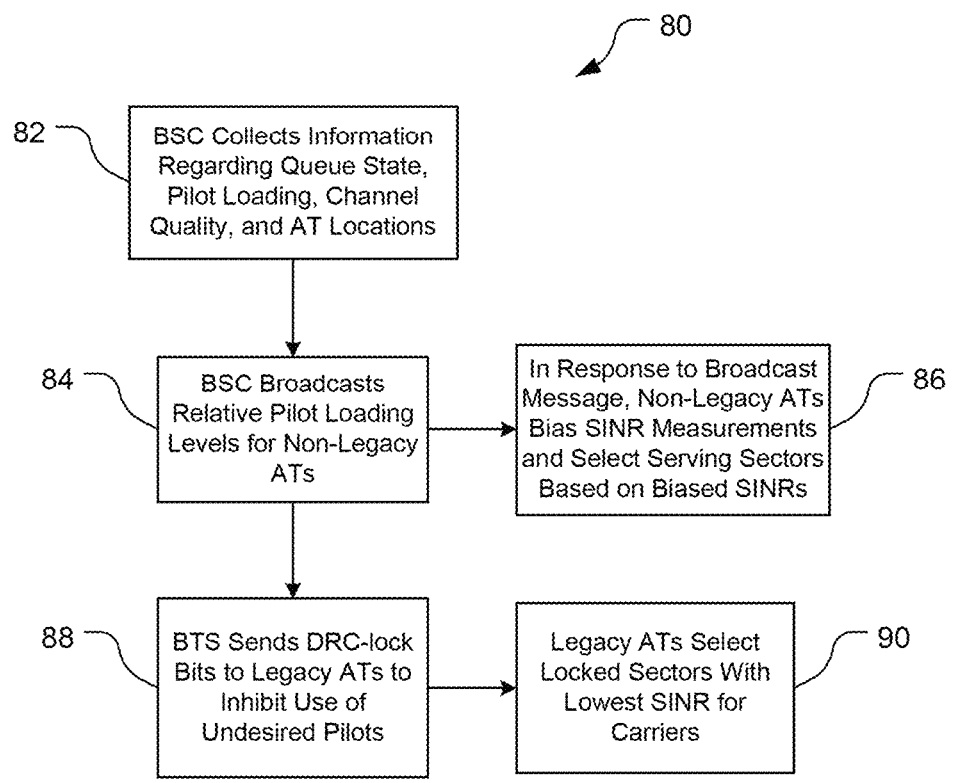
FIG. 12 is a block flow diagram of a process of influencing sector selection by the access terminals shown in FIG. 1.

Referring to FIG. 12, with further reference to FIGS. 1 and 5, a process 80 of providing AT DRC control includes the stages shown. The process 80 is, however, exemplary only and not limiting. The process 80 can be altered, e.g., by having stages added, removed, or rearranged. For example, while stages 82, 84, 86 are discussed as being implemented primarily by the BSC 18, these stages may be performed at the BSC 18, the ATs 16, or both the BSC 18 and the ATs 16.

With the process 80 of AT DRC control, the BSC 18 controls which BTSs 12 the ATs 16 will select for service based on factors in addition to SINR at the ATs 16.

At stage 82, the BSC 18 collects information to use in determining which pilots should be used by the ATs 16. Preferably, the controller 52 collects information regarding queue state, pilot loading, channel quality of visible pilots, and AT locations.

At stage 84, the BSC 18 broadcasts information for non-legacy ATs 16. The broadcast messages provide information about relative pilot loading levels of neighbor pilots. The BSC 18 periodically sends loading information (e.g., according to Equation (1), and possibly including backhaul bandwidth limitation effects) for each sector-carrier to all of its neighbor sector-carriers (i.e., to the BTSs 12 of the neighbor sector-carriers). The BTSs 12 collect the loading information into load messages that are broadcast periodically by the BTSs 12 on the control channel.

At stage 86, the non-legacy ATs 16 receive the broadcast message from the BSC 18, interpret the message, and act upon it. The load level modules 96 of the non-legacy ATs 16 use the pilot loading information to bias the serving sector selections by the pilot selection module 92 by biasing the received SINRs based on the pilot loading. The module 92 chooses the sector providing the best biased SINR for each carrier. For example, the module 92 can determine a biased SINR, $\gamma'_{s,c,t}$, for a given sector s, on carrier c, at time t, according to:

$$\gamma'_{s,c,t} = \gamma_{s,c,t} - Neff_{s,c,t} \quad (3)$$

where $Neff_{s,c,t}$ is given in Eq. (1), and $\gamma_{s,c,t}$ is the measured forward link SINR for the sector s, on carrier c, at time t. The result is BTS-assisted AT DRC repointing.

At stage 88, the BTSs 12 send information to control sector selection by legacy ATs 16. The BTSs 12 analyze loading information (see stage 84) from each pilot, and the ATs' 16 pilot strength to each pilot in the ATs' 16 active sets. From this, the BTSs 12 determine which sectors the BTSs 12 do not want respective legacy ATs 16 to select for corresponding carriers, and send DRC-lock bits to indicate unlock for the reverse link for the respective sector-carrier pairs to the appropriate ATs 16.

At stage 90, the legacy ATs 16 act upon the DRC-lock bits received from the controller 52. The pilot selection modules 92 of the legacy ATs 16 select the sector with the best SINR for a given carrier where the reverse link for that sector-carrier pair is locked. Note that while the pilot selection module 92 of FIG. 7 is referenced, this module differs between legacy and non-legacy ATs 16, and legacy ATs 16 will not include the load level module 96. The result is BTS-induced AT DRC repointing.

The use of AT pointing mechanisms can improve network efficiency. The efficiency can be improved even if less than all of the ATs 16 following balancing indications. As long as increased efficiency is possible, having some ATs 16 follow the balancing indications can improve the overall network efficiency by more effectively using network resources.

Considerations Regarding the Description

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The blocks of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software executed by a processor, firmware, or any combination thereof. If implemented in software executed by a processor, the functions may be stored on or transmitted over as one or more instructions or code on a computer-readable medium. Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not to be limited to the examples and designs described herein but is to be accorded the widest scope consistent with the principles and novel features disclosed herein.

What is claimed is:

1. A method of regulating data flow in a wireless communication network, the method comprising:

collecting, at a base station controller, data regarding dynamic loading of sector-carrier pairs (pilots) in communication sectors of the wireless communication network;

obtaining, at the base station controller, data rates for data flows of the pilots to access terminals within the wireless communication network;

determining, at the base station controller, one or more pilots to use for conveying data in the wireless communication network based on the data rates and the dynamic loading;

generating, at the base station controller, a topological spatial interference map representing pilot-to-pilot interference between pilots using a same channel; and altering, at the base station controller, data flow over the pilots by changing a data rate over at least one of the pilots to increase total data flow by changing a combination of pilots used by the wireless communication network for conveying data to increase the total data flow based on the topological spatial interference map.

2. The method of claim 1 wherein the altering comprises distributed network scheduling at a plurality of base transceiver stations of the network and biasing flow control rates at a base station controller of the network.

3. The method of claim 1 wherein the determining comprises analyzing multiple network data flow options where each option comprises a combination of pilots and respective data rates for the pilots, and wherein the altering changes a flow from a first pilot to a second pilot with a lighter load than the first pilot.

4. The method of claim 1 wherein the determining is based on cross-pilot interference, spatially non-uniform user demand, device partial loading performance, and load levels of the sector-carrier pairs.

5. The method of claim 1 wherein the determining comprises analyzing combinations of pilots as selected by the access terminals, the method further comprising at least one of:

biasing signal to interference-plus-noise ratio (SINR) measurements by at least some of the access terminals based on pilot loading and using biased SINR values by the access terminals to select pilots; or inhibiting selection by at least some of the access terminals of particular pilots based on pilot loading.

6. The method of claim 1 wherein the determining comprises analyzing combinations of pilots as selected by the access terminals, the method further comprising:

sending pilot loading information to the access terminals; and selecting pilots by the access terminals based on the loading information sent to the access terminals.

7. The method of claim 6 further comprising:
sending a threshold value to the access terminals;
comparing signal strengths of the pilots at the access terminals with the threshold value; and
sending an indication of poor forward link quality from a first access terminal corresponding to a pilot whose signal strength differs from a strongest pilot signal strength in an active set of the first access terminal by more than the threshold value.

8. The method of claim 1 wherein the determining comprises comparing total data rates of multiple network data flow options, where each option comprises a combination of pilots and respective data rates for the pilots, and wherein the altering comprises implementing the option with a highest total data rate of the multiple network data flow options.

9. The method of claim 1 further comprising determining cross-pilot coupling estimations using pilot strength indications from the access terminals, wherein determining the one or more pilots to use for conveying data uses the cross-pilot coupling estimations.

10. The method of claim 9 wherein determining the cross-pilot coupling estimations further includes using measured received power and access terminal location information.

11. The method of claim 9 further comprising reducing power in one or more pilots based on the cross-pilot coupling estimations.

12. The method of claim 9 further comprising disabling one or more pilots based on the cross-pilot coupling estimations.

13. The method of claim 1 wherein the altering comprises base transceiver stations exchanging loading information via a base station controller and a first base transceiver station changing data flow to a particular access terminal in response to loading information for the particular access terminal from a second base transceiver station distinct from the first base transceiver station.

14. The method of claim 1 wherein the collecting further includes collecting data from which data service rate, channel state, queue state, and quality of service (QoS) requirements of each pilot can be determined, and wherein the determining analyzes a tradeoff between (1) balancing pilot load and (2) partial loading performance and loss in serving pilot instantaneous signal quality.

15. A computer program product comprising:
a processor-readable non-transitory medium storing processor-readable instructions configured to cause a processor to:
collect, at a base station controller, data regarding dynamic loading of sector-carrier pairs (pilots) in communication sectors of a wireless communication network;
obtain, at the base station controller, data rates for data flows of the pilots to access terminals within the wireless communication network;
determine, at the base station controller, one or more pilots to use for conveying data in the wireless communication network based on the data rates and the dynamic loading;
generate, at the base station controller, a topological spatial interference map representing pilot-to-pilot interference between pilots using a same channel; and
alter, at the base station controller, data flow over the pilots by changing a data rate over at least one of the pilots to increase total data flow by changing a combination of pilots used by the wireless communication network for conveying data to increase the total data flow based on the topological spatial interference map.

16. The computer program product of claim 15 wherein the instructions configured to cause the processor to determine the one or more pilots are configured to cause the processor to consider cross-pilot interference, spatially non-uniform user demand, partial loading performance representing a difference in interference associated with pilot signals compared to interference associated with data traffic, and load balancing of traffic among the one or more pilots.

17. The computer program product of claim 15 wherein the instructions configured to cause the processor to determine the one or more pilots are configured to cause the processor to consider combinations of pilots as selected by the access terminals, the instructions being further configured to cause the processor to at least one of:

bias forward link signal to interference-plus-noise ratio (SINR) measurements based on pilot loading;

use biased SINR values to select pilots; or inhibit selection by at least one of the access terminals of a particular pilot based on pilot loading.

18. The computer program product of claim 15 wherein the instructions configured to cause the processor to alter data flow are configured to cause the processor to select pilots based on access terminal loading information.

19. The computer program product of claim 15 wherein the instructions configured to cause the processor to determine the one or more pilots are configured to cause the processor to:

compare signal strengths of pilots at a first access terminal with a threshold value received from a base transceiver station; and send an indication of poor forward link quality corresponding to a pilot whose signal strength differs from a strongest pilot signal strength in an active set of the first access terminal by more than the threshold value.

20. The computer program product of claim 15 wherein the instructions configured to cause the processor to determine the one or more pilots are configured to cause the processor to compare total data rates of multiple network data flow options, where each option comprises a combination of pilots and respective data rates for the pilots, and wherein the instructions configured to cause the processor to alter data flow are configured to cause the processor to implement the option with a highest total data rate of the multiple network data flow options.

21. The computer program product of claim 15 further comprising instructions configured to cause the processor to determine cross-pilot coupling estimations using pilot strength indications from the access terminals, wherein the instructions configured to cause the processor to determine the one or more pilots are configured to cause the processor to use the cross-pilot coupling estimations.

22. An apparatus configured to regulate data flow in a wireless communication network, the apparatus comprising:

means for collecting, at a base station controller, data regarding dynamic loading of sector-carrier pairs (pilots) in communication sectors of the wireless communication network;

means for obtaining, at the base station controller, data rates for data flows of the pilots to access terminals within the wireless communication network;

means for determining, at the base station controller, one or more pilots to use for conveying data in the wireless communication network based on the data rates and the dynamic loading;

means for generating, at the base station controller, a topological spatial interference map representing pilot-to-pilot interference between pilots using a same channel; and means altering, at the base station controller, data flow over the pilots by changing a data rate over at least one of the pilots to increase total data flow by changing a combination of pilots used by the wireless communication network for conveying data to increase the total data flow based on the topological spatial interference map.

23. The apparatus of claim 22 wherein the means for altering comprises means for scheduling at a plurality of base transceiver stations of the network and means for biasing flow control rates at a base station controller of the network.

24. The apparatus of claim 22 wherein the means for determining comprises means analyzing multiple network data flow options where each option comprises a combination of pilots and respective data rates for the pilots.

25. The apparatus of claim 22 wherein the means for determining comprises means for considering cross-pilot interference, spatially non-uniform user demand, partial loading performance representing a difference in interference associated with pilot signals compared to interference associated with data traffic, and load balancing of traffic among the one or more pilots.

26. The apparatus of claim 22 wherein the means for determining comprises means for analyzing combinations of pilots as selected by the access terminals, the apparatus further comprising at least one of:

means for biasing signal to interference-plus-noise ratio (SINR) measurements by at least some of the access terminals based on pilot loading and using biased SINR values by the access terminals to select pilots; or means for inhibiting selection by at least some of the access terminals of particular pilots based on pilot loading.

27. The apparatus of claim 22 wherein the means for determining comprises means for comparing total data rates of multiple network data flow options, where each option comprises a combination of pilots and respective data rates for the pilots, and wherein the means for altering is configured to implement the option with a highest total data rate of the multiple network data flow options.

28. The apparatus of claim 22 further comprising means for estimating cross-pilot coupling using pilot strength indications from the access terminals, wherein means for determining is configured to use the cross-pilot coupling estimations to determine the one or more pilots.

29. A base station controller of a wireless communication system, the base station controller comprising:

a network interface configured to communicate with a wired communication network;

a base transceiver station interface configured to wirelessly communicate with multiple base transceiver stations; and a scheduler configured to:

collect data regarding dynamic loading of sector-carrier pairs (pilots) in communication sectors of the wireless communication network;

obtain data rates for data flows of the pilots to access terminals within the wireless communication network;

determine a combination of pilots to use for conveying data in the wireless communication network based on the data rates and the dynamic loading;

generate a topological spatial interference map representing pilot-to-pilot interference between pilots using a same channel; and alter data flow over the pilots by changing data rates over the pilots and changing the pilots used in the wireless communication system according to the combination by changing a combination of pilots used by the wireless communication network for conveying data to increase the total data flow based on the topological spatial interference map.

30. The base station controller of claim 29 wherein the scheduler is configured to determine the combination based on network-wide tradeoffs involving at least one of cross-pilot interference, spatially non-uniform user demand, device partial loading performance, or load balancing.

31. The base station controller of claim 29 wherein the scheduler is configured to alter the data flow by sending pilot loading information via the base transceiver station interface toward base transceiver stations of the wireless communication network to bias scheduler weights at the base transceiver stations.

32. The base station controller of claim 29 further comprising a cross-pilot coupling module configured to produce cross-pilot coupling estimations using pilot strength indications from access terminals received via the base transceiver station interface, wherein the scheduler is configured to determine the combination using the cross-pilot coupling estimations.

33. The base station controller of claim 32 wherein the cross-pilot coupling module is configure to produce the cross-pilot coupling estimations using measured received power and access terminal location information.

34. A base transceiver station of a wireless communication system, the base transceiver station comprising:
an antenna configured for wireless communication with access terminals;
a transceiver coupled to the antenna and configured to send signals to and receive signals from the antenna;
a processor coupled to the transceiver and configured to analyze loading information of sector-carriers and send instructions, based on the loading information, via the transceiver toward the access terminals to inhibit selection by at least some of the access terminals of particular pilots, wherein the processor is further configured to generate a topological spatial interference map representing pilot-to-pilot interference between pilots using a same channel, and wherein the instructions to inhibit selection by at least some of the access terminals of particular pilots are based at least in part on the topological spatial interference map.

35. The base transceiver station of claim 34 wherein the instructions are DRC-lock indications indicating to the access terminals to unlock indicated sector-carriers.

* * * * *